United States Patent
Pasquet et al.

(10) Patent No.: US 9,719,492 B2
(45) Date of Patent: Aug. 1, 2017

(54) WIND TURBINE ROTOR

(71) Applicant: Alstom Renovables España, S.L., Barcelona (ES)

(72) Inventors: Pierre Pasquet, Alella (ES); Marc Cavallé, Barcelona (ES); Santiago Canedo Pardo, Barcelona (ES)

(73) Assignee: ALSTOM Renewable Technologies, Grenoble (FR)

( * ) Notice: Subject to any disclaimer, the term of this patent is extended or adjusted under 35 U.S.C. 154(b) by 573 days.

(21) Appl. No.: 14/357,765

(22) PCT Filed: Nov. 23, 2012

(86) PCT No.: PCT/EP2012/073436
§ 371 (c)(1),
(2) Date: May 12, 2014

(87) PCT Pub. No.: WO2013/076234
PCT Pub. Date: May 30, 2013

(65) Prior Publication Data
US 2014/0308131 A1    Oct. 16, 2014

Related U.S. Application Data

(60) Provisional application No. 61/589,919, filed on Jan. 24, 2012.

(30) Foreign Application Priority Data

Nov. 24, 2011    (EP) .................................... 11382363

(51) Int. Cl.
F03D 7/02    (2006.01)
F03D 7/04    (2006.01)
(Continued)

(52) U.S. Cl.
CPC ............ *F03D 7/0224* (2013.01); *F03D 7/04* (2013.01); *F03D 15/00* (2016.05);
(Continued)

(58) Field of Classification Search
CPC .......... F03D 7/0224; F03D 15/00; F03D 7/04; F16H 57/12; F16H 1/10; Y02E 10/722;
(Continued)

(56) References Cited

U.S. PATENT DOCUMENTS 7,699,584 B2    4/2010  Mollhagen
2004/0049920 A1*  3/2004  Kollmann ............... F16H 55/06
                                                                29/893.1
(Continued)

FOREIGN PATENT DOCUMENTS

DE    10 2004 017323    11/2005
DE    20 2005 014699    1/2006
(Continued)

OTHER PUBLICATIONS

International Search Report for PCT/EP2012/073436, mailed Jun. 11, 2013, 11 pgs.

*Primary Examiner* — Michael R Reid
*Assistant Examiner* — Christopher Ballman
(74) *Attorney, Agent, or Firm* — Dority & Manning, P.A.

(57) ABSTRACT

A wind turbine rotor includes a hub, a plurality of blades, and a pitch system for rotating a blade substantially along its longitudinal axis. The pitch system includes a bearing, a motor, and a gear system, wherein the gear system has a driving pinion operationally connected with the motor, an annular gear arranged to mesh with the driving pinion. Additional gear teeth are arranged to mesh with other parts of the gear system in a predefined blade position for wind speeds at or below a nominal wind speed such that upon movement from the predefined blade position, the additional gear teeth come into contact with the other parts of the gear system before the driving pinion comes into contact with the annular gear.

18 Claims, 4 Drawing Sheets

(51) Int. Cl.
    *F03D 15/00*    (2016.01)
    *F16H 1/10*     (2006.01)
    *F16H 57/12*    (2006.01)

(52) U.S. Cl.
    CPC ..... *F05B 2260/503* (2013.01); *F05B 2260/76* (2013.01); *F05B 2260/79* (2013.01); *F05B 2280/4006* (2013.01); *F16H 1/10* (2013.01); *F16H 57/12* (2013.01); *Y02E 10/723* (2013.01)

(58) Field of Classification Search
    CPC ............ Y02E 10/723; F05B 2260/503; F05B 2260/76; F05B 2260/79; F05B 2280/4006
    See application file for complete search history.

(56) References Cited

U.S. PATENT DOCUMENTS

| | | | | |
|---|---|---|---|---|
| 2006/0205554 | A1* | 9/2006 | Nohara | F03D 7/0204 475/179 |
| 2010/0273597 | A1* | 10/2010 | Wilson, Jr. | A62B 1/10 475/149 |
| 2011/0082005 | A1* | 4/2011 | Fox | F03D 15/00 475/347 |
| 2011/0138945 | A1 | 6/2011 | Watanabe | |
| 2011/0206516 | A1* | 8/2011 | Henriksen | F03B 3/145 416/155 |
| 2011/0254272 | A1* | 10/2011 | Lee | F03D 7/0204 290/44 |
| 2012/0134830 | A1* | 5/2012 | Tozzi | F03D 7/0212 416/169 R |

FOREIGN PATENT DOCUMENTS

| | | |
|---|---|---|
| EP | 1816346 | 8/2007 |
| EP | 2431606 | 3/2012 |
| EP | 2546517 | 1/2013 |
| FR | EP 0406089 A1 * 1/1991 ........... B60N 2/2252 |
| JP | 2012-66363 | 10/1989 |
| WO | WO 2006/032438 | 3/2006 |
| WO | WO 2008/074320 | 6/2008 |
| WO | WO 2013141201 | 9/2013 |

\* cited by examiner

WIND TURBINE ROTOR

This application claims the benefit of European Patent Application 11382363.7 filed Nov. 24, 2011 and U.S. Provisional Patent Application Ser. No 61/589,919 filed Jan. 24, 2012.

The present invention relates to wind turbine rotors, and more particularly relates to wind turbine rotors comprising at least one electromechanical pitch mechanism.

BACKGROUND ART

Modern wind turbines are commonly used to supply electricity into the electrical grid. Wind turbines generally comprise a rotor with a rotor hub and a plurality of blades. The rotor is set into rotation under the influence of the wind on the blades. The rotation of the rotor shaft drives the generator rotor either directly ("directly driven") or through the use of a gearbox.

Pitch systems may be employed for adapting the position of a wind turbine blade to varying wind conditions. In this respect, it is known to rotate the position of a wind turbine blade along its longitudinal axis in such a way that it generates less lift (and drag) when the wind speed increases. In this way, even though the wind speed increases, the torque transmitted by the rotor to the generator remains substantially the same. It is furthermore also known to rotate wind turbine blades towards their stall position (so as to reduce the lift on the blades) when the wind speed increases. These wind turbines are sometimes referred to as "active-stall" wind turbines. Pitching may furthermore also be used for rotation of the blades towards their vane position, when a turbine is temporarily stopped or taken out of operation for e.g. maintenance.

Pitch systems generally comprise an electric or hydraulic motor which, through the use of reduction gearing (sometimes referred to as a "reductor", or "reduction gear"), drives an actuating gear. Said actuating gear (pinion) is generally arranged to mesh with an annular gear provided on the wind turbine blade to set the wind turbine blade into rotation. Other actuating mechanisms operated by a pitch motor are also known.

It is further known to provide an individual pitch system (comprising a separate motor and separate control) for each individual wind turbine blade of a rotor. It is also known to provide a common pitch system wherein the pitch angle of the blades is the same for all blades on a rotor. Such a common pitch system may comprise a single motor or may comprise a plurality of motors, one for each blade.

A control strategy of a pitch system that is often employed in variable speed wind turbines is to maintain the blade in a default pitch position at wind speeds equal to or below nominal wind speed (for example, approximately 4 m/s-15 m/s). Said default pitch position may generally be close to a 0° pitch angle. The exact pitch angle in or below nominal wind speed conditions depends however on the complete design of the wind turbine. Above the nominal wind speed (for example from approximately 15 m/s-25 m/s), the blades are rotated to maintain the aerodynamic torque delivered by the rotor substantially constant. When the wind turbine is not operating, the blades may assume a vane position (e.g. at or around 90° pitch angle) to minimize the loads on the blades. During most of the wind turbine's life, a blade may however be in the same pitch position which is that at or below nominal wind speed. The nominal wind speed, cut-in wind speed and cut-out wind speed may of course vary depending on the wind turbine design.

During operation of the wind turbine, forces may be acting on the blades that result in a constantly varying torque around the blade's longitudinal axis. These forces may include the aerodynamic torque around the longitudinal axis of the blade. Furthermore, since the blade's centre of mass is usually not located exactly on its rotating axis, the weight of the blade may exercise an additional torque around the blade's longitudinal axis. Both these forces are non-constant, largely cyclical and tend to rotate the blade out of the position determined by the pitch control system.

When a pitch system involving gearing is used, the varying torque may result in flanks of the teeth of the actuating gear (pinion) and annular gear repeatedly touching each other. Such repetitive contact between teeth may remove thin metallic particles, and may create a tooth print in the contacting flanks of the gear and the pinion. This repetitive contact may thus lead to fretting corrosion and premature wear. Since the pitch position at or below nominal wind speed is the prevailing position for most of the life of most wind turbines, the repetitive contact between the teeth and the corresponding consequences are usually concentrated on the same teeth.

Some solutions for these problems are known. It is e.g. known to provide an automatic lubrication system to try and prevent fretting corrosion. For example, DE202005014699U and EP1816346 provide such lubrication systems. These lubrication systems may help to reduce fretting corrosion to a smaller or larger extent, but do not combat or resolve the problem underlying the corrosion, namely the teeth flanks contacting each other. Further, once the teeth contacting the pinion are damaged, the whole annular gear needs to be replaced.

There still exists a need to achieve an electromechanical pitch drive system which can easily extend the life of the annular gear and the driving pinion and is also cost-effective.

SUMMARY OF THE INVENTION

In a first aspect, a wind turbine rotor comprising a hub, a plurality of blades and at least one pitch system for rotating a blade substantially along its longitudinal axis is provided. The pitch system comprises a bearing, a motor and a gear system. The gear system comprises a driving pinion operationally connected with the motor, an annular gear arranged to mesh with the driving pinion, and additional gear teeth. The additional gear teeth are arranged to mesh with other parts of the gear system at least in a predefined blade position for wind speeds at or below nominal wind speed, and are arranged such that upon movement from said predefined blade position, the additional gear teeth come into contact with said other parts of the gear system before the driving pinion comes into contact with the annular gear.

According to this aspect, the varying torque causing teeth wear is shared between two different arrangements of teeth involving different parts of the gear system, the driving pinion's teeth meshing with the annular gear's teeth and the additional teeth gear meshing with other parts of the gear system. This way, the induced torque in the teeth of the driving pinion and the annular gear is at least partially decreased and the life of the driving pinion and the annular gear may thus be extended. Furthermore, the first contact is established between the additional teeth and the corresponding other parts of the gear system.

Further, such a torque reduction of the meshing engagement between the driving pinion and the annular gear is provided when it is most needed, namely when the blade needs to be kept in standstill position i.e. for wind speeds at or below nominal wind speed. Furthermore, the additional meshing engagement does not interfere with the normal operation of the pitch system, e.g. it allows complete rotation of the blade without interference.

In some embodiments, the additional gear teeth may comprise an additional pinion coaxially mounted on the driving pinion and arranged to mesh with the annular gear. This way, stress and torque release of the driving pinion is achieved and its life may thus be extended.

In other embodiments, the additional gear teeth may comprise an additional annular gear segment arranged at least in a predefined blade position for wind speeds at or below nominal wind speed, said additional annular gear segment may be arranged to mesh with the driving pinion. This way, the stress of the annular gear is released, and its life may thus be extended. Further, as the additional retention moment is only needed in a blade position for wind speeds at or below nominal wind speed, the additional annular gear segment does not require many teeth which means that it does not necessarily involve high material costs.

In yet further embodiments, the additional gear teeth may comprise an additional pinion coaxially mounted on the driving pinion and an additional annular gear segment arranged at least in a predefined blade position for wind speeds at or below nominal wind speed, wherein the additional pinion and the additional annular gear segment may be arranged to mesh with each other. This way the life of both, driving pinion and annular gear may be extended.

In some embodiments, the additional gear teeth may comprise teeth made of a deformable material. In others, a deformable material may be arranged in a layer covering teeth of the additional pinion and/or in a layer covering teeth of the additional annular gear segment. This way, once the additional gear teeth of the additional pinion or the additional annular gear segment are in contact with corresponding other parts of the gear system, the deformable material absorbs torque loads up to a threshold value after which the driving pinion comes into contact with the annular gear. The deformable material is thus used to achieve a retention moment.

In other embodiments, the additional pinion may be mounted around a torsion bar provided on its rotational axis and the torsion bar may be fixed to the driving pinion. Such a torsion bar resists torque loads up to a threshold value after which it twists around its longitudinal axis thus rotating the additional pinion with respect to the driving pinion. This way, the driving pinion comes into contact with the annular gear.

In some embodiments, the additional annular gear segment may comprise a pitch circle larger than that of the annular gear. In other embodiments, it may comprise teeth of varying size and a pitch circle substantially equal to that of the annular gear. Either way, the meshing engagement between the additional annular gear segment and the additional pinion (or driving pinion) is provided only when it is most needed, namely when the blade needs to be kept in standstill position i.e. in a predefined blade position for wind speeds at or below nominal wind speed.

In various embodiments, the wear of the system may be concentrated on the additional teeth, e.g. an additional annular gear segment. Such an additional gear segment may be replaced at a relatively low cost once it is worn out. The main annular gear would not need to be replaced.

Another aspect provides a wind turbine comprising a wind turbine rotor substantially as hereinbefore described.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 1:
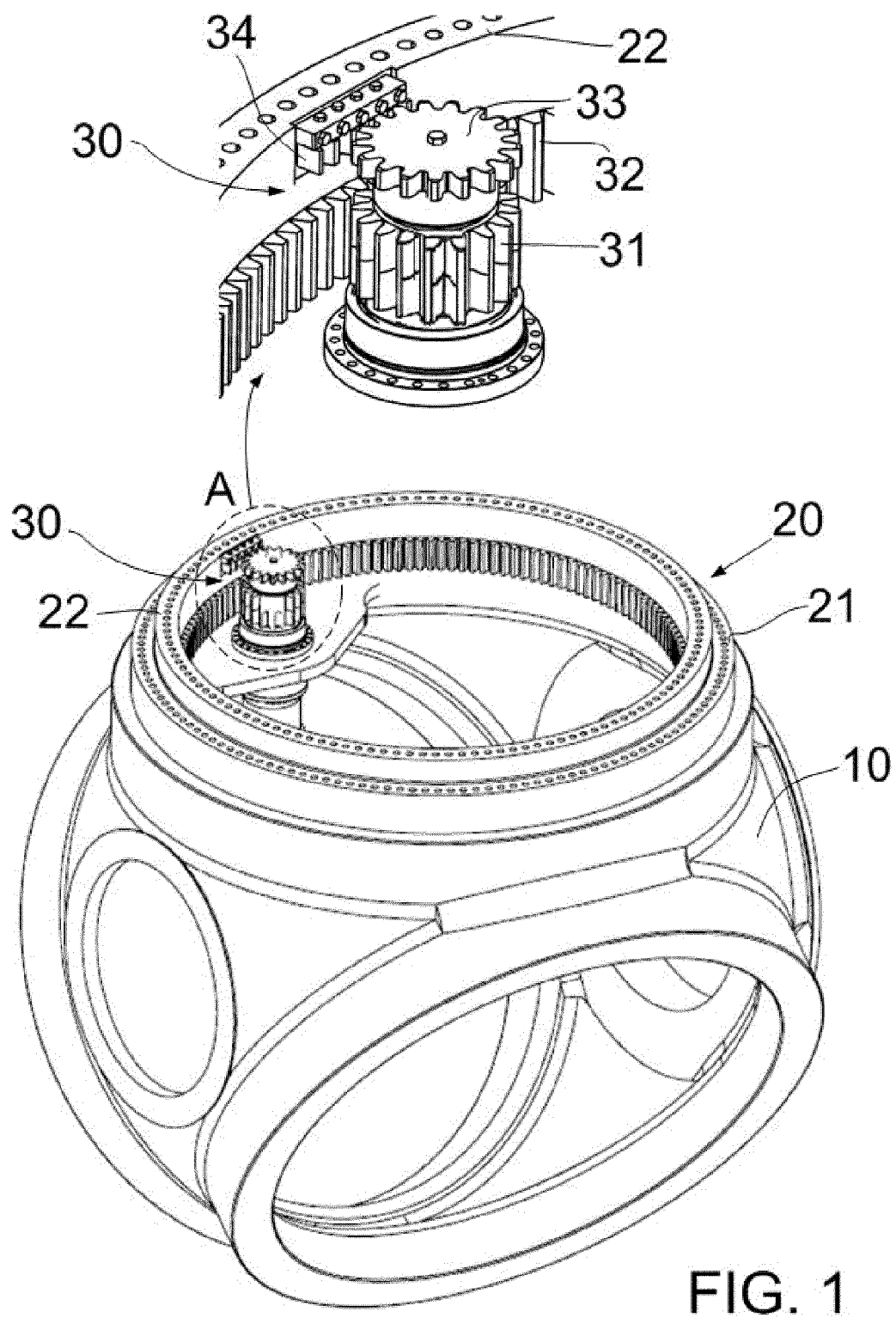
FIG. 1 shows a perspective view of a wind turbine rotor according to a first embodiment.

FIG. 1 shows a wind turbine rotor according to a first embodiment. The rotor may comprise a hub 10 to which a plurality of blades (not shown) may be rotatably attached. Pitch systems may be provided for rotating each of the blades substantially along its longitudinal axis. A pitch system may comprise a pitch bearing 20, a motor (not shown) and a gear system 30. The bearing 20 may comprise an outer bearing ring 21 connected with the hub 10 and an inner bearing ring 22 connected with a blade (not shown). It should be noted, that in other implementations the blades could be attached either at the outer or at the inner bearing ring and the hub would be attached to the other of the outer or inner bearing ring. According to the embodiment shown in FIG. 1, the inner bearing ring 21 may be higher than the outer bearing ring 22.

An enlarged view of detail A indicated in FIG. 1 shows that according to this first embodiment, the gear system 30 may comprise a driving pinion 31 operationally connected with the motor, an annular gear 32 arranged to mesh with the driving pinion 31, and an additional pinion 33 arranged to mesh with an additional annular gear segment 34. The additional pinion 33 may be coaxially mounted on the driving pinion 31 and the additional annular gear segment 34 may be arranged in a predefined blade position for wind speeds at or below nominal wind speed.

Further, the teeth of additional annular gear segment 34 may be substantially aligned with the teeth of annular gear 32. This way when both pinions 31, 33 are in meshing engagement respectively with the annular gear 32 and with the additional annular gear segment 34 they mesh practically simultaneously.

Figure 2:
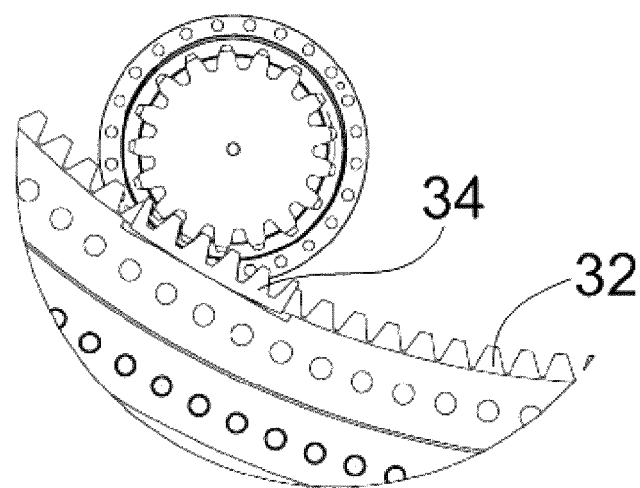
FIG. 2 shows a top view of detail A indicated in FIG. 1.

FIG. 2 shows a top view of detail A of FIG. 1. According to this embodiment, the additional annular gear segment 34 may comprise a pitch circle (primitive diameter) that is larger than that of the annular gear 32. This way, the additional annular gear sector only meshes completely with the additional pinion when needed, i.e. in a predefined blade position for wind speeds at or below nominal wind speed. Further, according to FIG. 2 all teeth of the additional annular gear sector may be machined identically which may simplify the manufacture of the additional annular gear sector. In other implementations, each tooth of the additional annular gear sector may be machined differently and the additional annular gear segment may comprise teeth of varying size. In these cases, the pitch circle of the additional annular gear segment may be substantially equal to that of the annular gear and the size of the teeth may be adapted to achieve the same effect, i.e. that complete meshing only occurs at a predefined blade position for wind speeds at or below nominal wind speed.

Further, depending on the shape of the additional annular gear segment, the bearing ring on which it is mounted may be machined or not. In some cases, the additional annular gear segment may be fixed to the bearing ring, e.g. through an adapter comprising a plurality of holes to facilitate its attachment with bolts or similar.

Figure 3:
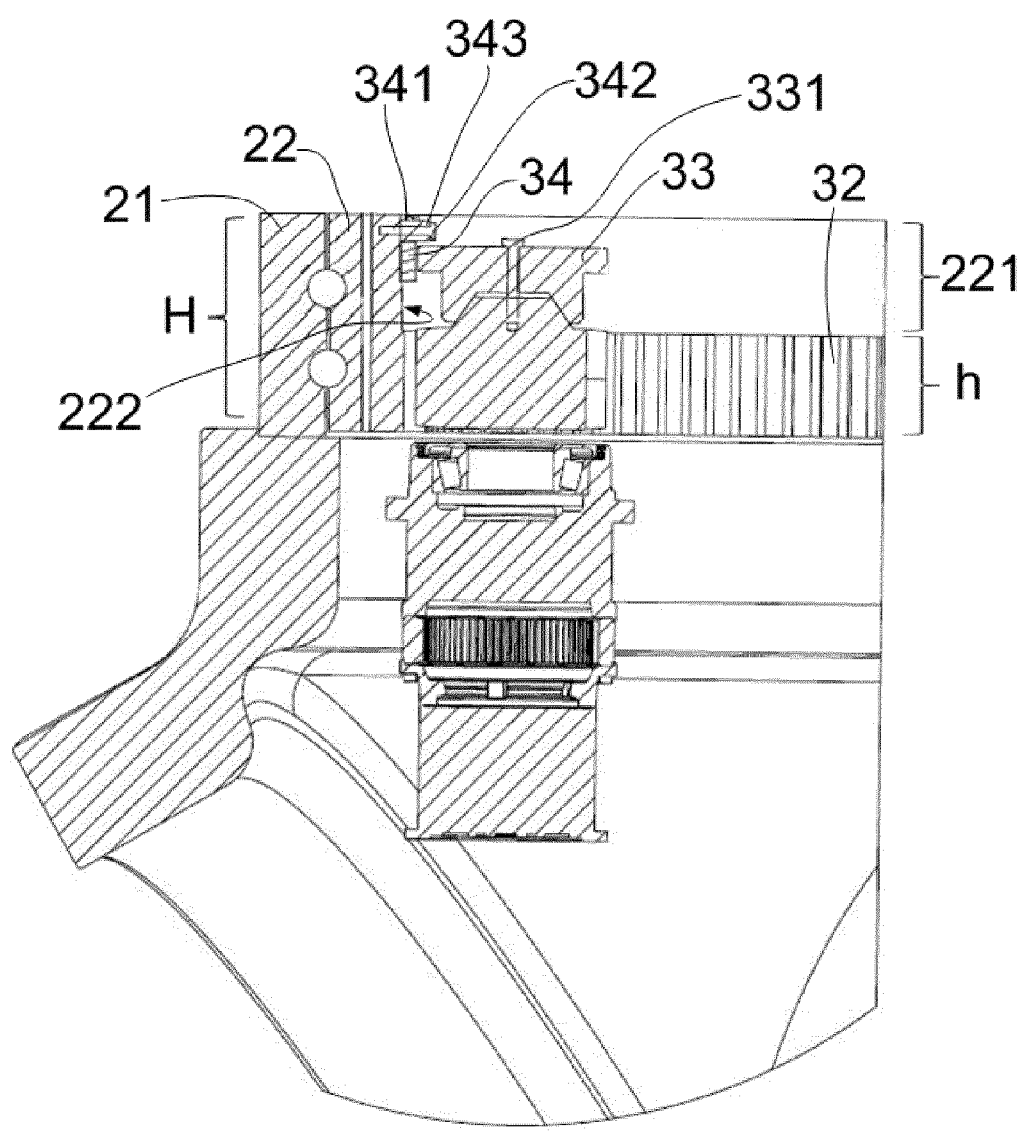
FIG. 3 shows a cross-sectional view of another embodiment.

FIG. 3 shows a cross-sectional view of a detail similar to detail A of FIG. 1 according to another implementation in which both bearing rings 21, 22 have the same height. FIG. 3 shows that the annular gear 32 may have a height h in an axial direction which may be smaller than a height H of the inner bearing ring 22 such that a gearless portion 221 may be defined on an inner side 222 of the inner bearing ring 22. This way, the additional annular gear segment 34 may be fixed to said gearless portion 221.

Further, FIG. 3 shows that the additional annular gear segment 34 may be axially fixed to a support or adapter 343 by means of screws 341 and the adapter 343 may be radially fixed to the inner bearing ring 22 by means of further screws 342. In addition, the additional pinion 33 may be coaxially mounted on the driving pinion 31 by means of a screw 331. This way, maintenance works may be simplified as both parts can be easily replaced. Also, since the wear is usually concentrated on the same teeth, the additional pinion can be turned around its own axis before replacing it.

Figure 4A:
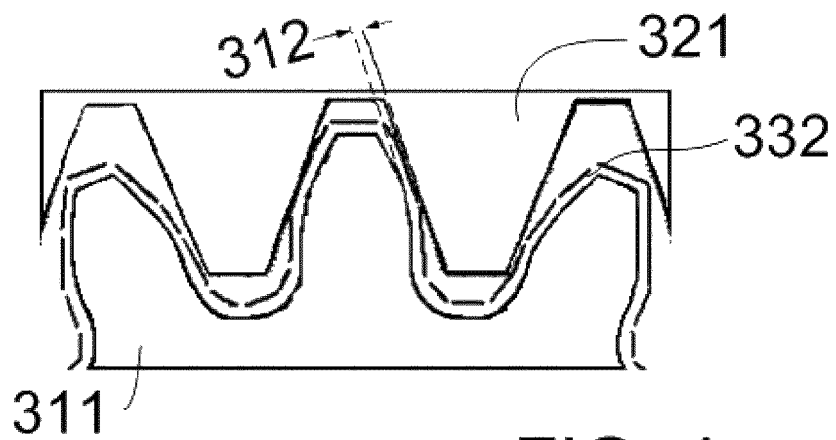
FIGS. 4a and 4b show a top view of a sequence of two situations of the additional gear teeth meshing with other parts of the gear system with respect to the driving pinion's teeth.
Figure 4B:

FIGS. 4a and 4b show a top view of a sequence of two situations of the additional gear teeth 332 meshing with other parts of the gear system with respect to the driving pinion's teeth 311. According to this embodiment, the additional gear teeth may be an additional pinion and the other parts of the gear system may be the annular gear. Thus, the additional pinion meshes with an upper or lower portion of the annular gear and the driving pinion meshes with the other of the upper or lower portion of the annular gear. It should be noted, that in other implementations the additional gear teeth may be the driving pinion and the other parts of the gear system may be an additional annular gear segment. In these cases, the additional annular gear segment meshes with an upper or lower portion of the driving pinion and the annular gear meshes with the other of the upper or lower portion of the driving pinion. In yet further implementations the other parts of the gear system may be an additional annular gear sector and the additional gear teeth may be an additional pinion.

FIG. 4a shows a situation in which the blade may be in the pitch position at or below nominal wind speed. In this situation, the teeth of the additional pinion 332 (in dashed line) mesh with the teeth of the annular gear 321 and the teeth of the driving pinion 311 are not yet in meshing engagement, hence there is a gap 312 between the teeth of the driving pinion 311 and the teeth of annular gear 321. Or put another way, the additional pinion and the annular gear have less backlash than that between the driving pinion and the annular gear. The term "backlash" should be understood as the size of the gap between the trailing face of a driving tooth and the leading face of the tooth behind it on the driven gear.

FIG. 4b shows a situation in which the blade has been moved away from the pitch position at or below nominal wind speed. In this situation, teeth of the driving pinion 311 mesh with the teeth of the annular gear 321.

In some embodiments, a deformable material (no shown) may be arranged in a layer covering the teeth of the additional pinion. Such a deformable material may absorb torque loads up to a threshold value after which the driving pinion and the annular gear have zero backlash.

In some embodiments, the deformable material may be polyamide. In those embodiments, wherein a deformable material is arranged in a layer covering teeth of the additional pinion and in order to improve the additional pinion's rigidity, the additional pinion core may be made of steel with a polyamide coating. In other embodiments, the additional gear teeth may be made of a deformable material.

Figure 5A:
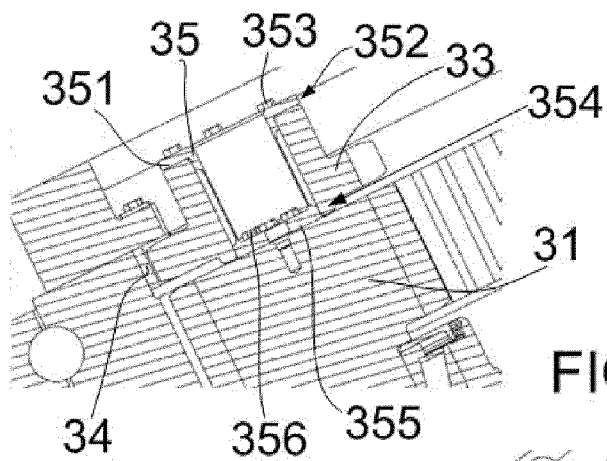
FIGS. 5a, 5b and 5c show respectively a cross-sectional view, a perspective view and a top view of a second embodiment.
Figure 5B:
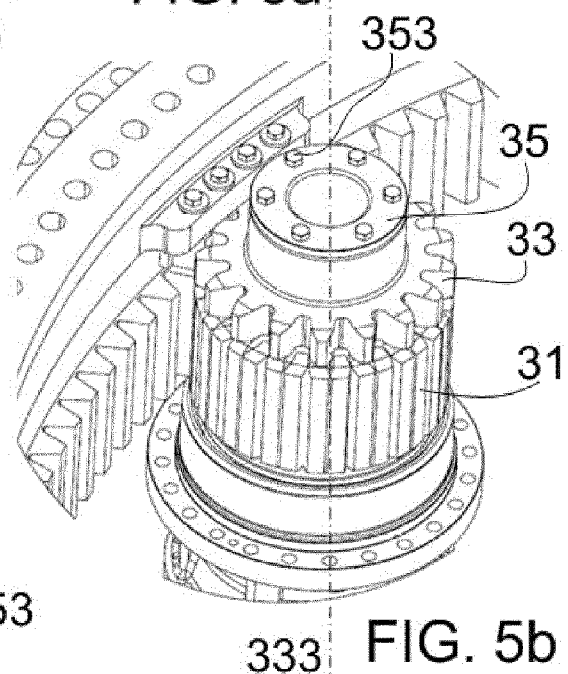
Figure 5C:
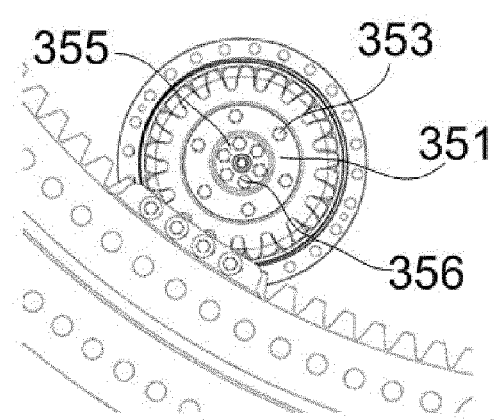

FIGS. 5a, 5b and 5c show a second embodiment in which the additional pinion may be mounted around a torsion bar 35 provided along its rotational axis and the torsion bar 35 may be fixed to the driving pinion 31.

FIG. 5a shows in cross-section how the torsion bar 35 is arranged. The torsion bar 35 may comprise a first flange 351 at one of its ends 352. Said first flange 351 may embrace the additional pinion 33 and screws 353 may be used to fix the first flange 351 to the additional pinion 33. The opposite end 354 of the torsion bar 35 may comprise a second flange 355. The second flange 355 may be fixed to the driving pinion 31 by further screws 356. The torsion bar 53 may thus be fixed at both ends 352, 354 to different parts resisting torque. Since the additional pinion 33 may be much stiffer than the torsion bar 35, only when the torque transmitted by the additional pinion 33 (which is in meshing engagement with the additional annular gear segment 34) overpasses a threshold value, a deformation of the torsion bar 35 results in teeth of the driving pinion 31 coming into contact with teeth of the annular gear 32. At least some of the initial torque is absorbed by the arrangement additional pinion-additional annular gear segment.

FIG. 5b shows in perspective that the torsion bar 35 may be mounted on a rotational axis 333 of the additional pinion 33 using screws 353. In the example shown in FIG. 5b, six screws. Since the wear in the additional pinion 33 is normally concentrated in only a few teeth flanks, each screw 353 may define a different assembly position for the additional pinion 33. A changing in the mounting position of the additional pinion may thus be considered an easy maintenance operation which allows renewing the working teeth without replacing the additional pinion thus extending its life. In alternative embodiments, naturally a different number of screws may be used.

FIG. 5c shows a top view of FIGS. 5a and 5b. In FIG. 5c the screws 356 fixing the torsion bar 35 to the driving pinion 31 are also shown. These screws 356 may be concentrically arranged with respect to the screws 353 fixing the torsion bar 35 to the additional pinion 33. This ensures a substantially precise deformation of the torsion bar 35 (as close as possible to a theoretical deformation).

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A wind turbine rotor comprising
a hub, a plurality of blades and at least one pitch system for rotating a blade substantially along its longitudinal axis, the pitch system comprising:
a bearing, a motor and a gear system, the gear system comprising a driving pinion operationally connected with the motor, an annular gear arranged to mesh with the driving pinion,
additional gear teeth, the additional gear teeth being arranged to mesh with other parts of the gear system at least in a predefined blade position for wind speeds at or below a nominal wind speed, and arranged such that upon movement from the predefined blade position, the additional gear teeth come into contact with the other parts of the gear system before the driving pinion comes into contact with the annular gear; and
wherein the additional gear teeth and the other parts of the gear system have less backlash than the driving pinion and the annular gear.

2. The wind turbine rotor of claim 1, wherein the additional gear teeth comprise teeth made of a deformable material.

3. The wind turbine rotor of claim 2, wherein the deformable material is polyamide.

4. A wind turbine comprising a wind turbine rotor according to claim 1.

5. A wind turbine rotor comprising:
a hub, a plurality of blades and at least one pitch system for rotating a blade substantially along its longitudinal axis, the pitch system comprising:
a bearing, a motor and a gear system, the gear system comprising a driving pinion operationally connected with the motor, an annular gear arranged to mesh with the driving pinion, and
additional gear teeth, the additional gear teeth being arranged to mesh with other parts of the gear system at least in a predefined blade position for wind speeds at or below a nominal wind speed, and arranged such that upon movement from the predefined blade position, the additional gear teeth come into contact with the other parts of the gear system before the driving pinion comes into contact with the annular gear; and
wherein the additional gear teeth comprise an additional pinion coaxially mounted on the driving pinion and arranged to mesh with the annular gear.

6. The wind turbine rotor of claim 5, further comprising an additional annular gear segment arranged at least in a predefined blade position for wind speeds at or below the nominal wind speed, the additional pinion and the additional annular gear segment being arranged to mesh with each other.

7. The wind turbine rotor of claim 6, wherein a deformable material is arranged in a layer covering teeth of the additional pinion.

8. The wind turbine rotor according of claim 6, wherein a deformable material is arranged in a layer covering teeth of the additional annular gear segment.

9. The wind turbine rotor of claim 6, wherein the additional pinion is mounted around a torsion bar provided on its rotational axis and the torsion bar is fixed to the driving pinion.

10. The wind turbine rotor of claim 5, wherein a deformable material is arranged in a layer covering teeth of the additional pinion.

11. The wind turbine rotor of claim 5, wherein the additional pinion is mounted around a torsion bar provided on its rotational axis and the torsion bar is fixed to the driving pinion.

12. The wind turbine rotor of claim 5, wherein the additional pinion and the annular gear or the additional annular gear segment have less backlash than the driving pinion and the annular gear.

13. The wind turbine rotor of claim 5, wherein the driving pinion and additional pinion are driven by the same motor.

14. A wind turbine rotor comprising:
a hub, a plurality of blades and at least one pitch system for rotating a blade substantially along its longitudinal axis, the pitch system comprising:
a bearing, a motor and a gear system, the gear system comprising a driving pinion operationally connected with the motor, an annular gear arranged to mesh with the driving pinion, and
additional gear teeth, the additional gear teeth being arranged to mesh with other parts of the gear system at least in a predefined blade position for wind speeds at or below a nominal wind speed, and arranged such that upon movement from the predefined blade position, the additional gear teeth come into contact with the other parts of the gear system before the driving pinion comes into contact with the annular gear; and
wherein the additional gear teeth comprise an additional annular gear segment arranged at least in a predefined blade position for wind speeds at or below the nominal wind speed, the additional annular gear segment being arranged to mesh with the driving pinion.

15. The wind turbine rotor of claim 14, wherein a deformable material is arranged in a layer covering teeth of the additional annular gear segment.

16. The wind turbine rotor of claim 14, wherein the additional annular gear segment comprises a pitch circle larger than that of the annular gear.

17. The wind turbine rotor of claim 14, wherein the additional annular gear segment comprises teeth of varying size and a pitch circle substantially equal to that of the annular gear.

18. The wind turbine rotor of claim 14, wherein the additional annular gear segment and the driving pinion or the additional pinion have less backlash than the annular gear and the driving pinion.

* * * * *